United States Patent
Kim (10) Patent No.: US 12,341,432 B2
(45) Date of Patent: Jun. 24, 2025

(54) FULL BRIDGE LLC CONVERTER SYSTEM AND METHOD OF VOLTAGE REGULATION USING A FULL BRIDGE LLC CONVERTER

(71) Applicant: Infineon Technologies Austria AG, Villach (AT)

(72) Inventor: Tae Yong Kim, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 245 days.

(21) Appl. No.: 18/139,088

(22) Filed: Apr. 25, 2023

(65) Prior Publication Data

US 2024/0364225 A1    Oct. 31, 2024

(51) Int. Cl.
*H02M 3/335*    (2006.01)
*H02M 1/00*    (2006.01)

(52) U.S. Cl.
CPC ..... *H02M 3/33571* (2021.05); *H02M 1/0058* (2021.05)

(58) Field of Classification Search
CPC ............. H02M 3/335; H02M 3/33571; H02M 1/0054; H02M 1/0058
See application file for complete search history.

(56) References Cited

U.S. PATENT DOCUMENTS

| | | | | |
|---|---|---|---|---|
| 11,509,213 | B2* | 11/2022 | Yang | H02M 3/33592 |
| 11,539,300 | B1* | 12/2022 | Wu | H02M 3/33573 |
| 11,594,948 | B2* | 2/2023 | Morrison | H02M 3/33569 |
| 2023/0163682 | A1* | 5/2023 | Shah | H02M 3/01 363/13 |
| 2025/0047188 | A1* | 2/2025 | Cao | H02M 1/08 |
| 2025/0055376 | A1* | 2/2025 | Mallik | H02M 7/53871 |

* cited by examiner

*Primary Examiner* — Adolf D Berhane
(74) *Attorney, Agent, or Firm* — Murphy, Bilak & Homiller, PLLC (57) ABSTRACT

A method of voltage regulation using a full bridge LLC converter includes: selecting a control mode for the full bridge LLC converter based on a nominal output voltage for the full bridge LLC converter, including selecting a first control mode if the nominal output voltage is a first voltage and selecting a second control mode if the nominal output voltage is a second voltage less than the first voltage; in the first control mode, operating the full bridge LLC converter as a full bridge under frequency control; and in the second control mode, operating a first half bridge of the full bridge LLC converter under frequency control and operating a second half bridge of the full bridge LLC converter under duty cycle control with valley switching.

20 Claims, 10 Drawing Sheets

FULL BRIDGE LLC CONVERTER SYSTEM AND METHOD OF VOLTAGE REGULATION USING A FULL BRIDGE LLC CONVERTER

BACKGROUND

Charger (adapter) and charging station output voltage range has become wider to support various battery output voltages, e.g., 24V to 240V. Output power may range from 60 W to 200 W for adapter (charger) applications such as USB power delivery (USB PD). For charging station applications, output power may range from 2 to 3 KW or higher, e.g., 6 kW or higher for a full bridge LLC converter.

LLC converter designs can support an output voltage range of about +/−20~30% and do not easily cover a wide output voltage range, e.g., a maximum output voltage that is three times or higher than the minimum output voltage. A first solution to support a wide output voltage range uses a separate charger to support each battery output voltage, which requires two or more different systems depending on the number of battery output voltages to be supported. A second solution uses an additional circuit at the single output of the converter, which requires a more complicated circuit design to support a wide output voltage range. A third solution uses a very wide operating frequency range, which is not easy to control and requires component-level support.

Thus, there is a need for an improved power converter for charger (adapter) and charging station applications with a very wide output range.

SUMMARY

According to an embodiment of a method of voltage regulation using a full bridge LLC converter, the method comprises: selecting a control mode for the full bridge LLC converter based on a nominal output voltage for the full bridge LLC converter, wherein selecting the control mode comprises selecting a first control mode if the nominal output voltage is a first voltage and selecting a second control mode if the nominal output voltage is a second voltage less than the first voltage; in the first control mode, operating the full bridge LLC converter as a full bridge under frequency control; and in the second control mode, operating a first half bridge of the full bridge LLC converter under frequency control and operating a second half bridge of the full bridge LLC converter under duty cycle control with valley switching.

According to an embodiment of a full bridge LLC converter system, the full bridge LLC converter system comprises: a full bridge LLC converter comprising a first half bridge, a second half bridge, and a resonant tank electrically coupled to an output of both the first half bridge and the second half bridge; and at least one controller configured to select a control mode for the full bridge LLC converter based on a nominal output voltage for the full bridge LLC converter, wherein the at least one controller is configured to select a first control mode if the nominal output voltage is a first voltage and select a second control mode if the nominal output voltage is a second voltage less than the first voltage, wherein in the first control mode, the at least one controller is configured to operate the full bridge LLC converter as a full bridge under frequency control, wherein in the second control mode, the at least one controller is configured to operate the first half bridge under frequency control and operate the second half bridge under duty cycle control with valley switching.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a single full bridge LLC converter system and corresponding control technique for supporting a wide output voltage range, e.g., 24V to 240V. The control technique does not require a correspondingly wide operating frequency range to support the wide output voltage range. Instead, the full bridge LLC converter has at least two different control modes each of which supports a subset of the total supported output voltage range. The control mode is selected based on a nominal output voltage for the full bridge LLC converter. The first control mode supports the highest output voltage range. One or more additional control modes support progressively lower output voltage ranges. The number of additional control modes depends on the total output voltage range being supported.

The first control mode is selected if the nominal output voltage for the full bridge LLC converter system is a first voltage and a second control mode is selected if the nominal output voltage is a second voltage less than the first voltage. In the first control mode, the full bridge LLC converter is operated as a full bridge under frequency control. In the second control mode, a first half bridge of the full bridge LLC converter is operated under frequency control and a second half bridge of the full bridge LLC converter is operated under duty cycle control with valley switching.

One or more additional control modes may be available, to support an even wider output voltage range. For example, a third control mode may be selected if the nominal output voltage for the full bridge LLC converter system is a third voltage less than the second voltage. In the third control mode, the first half bridge of the full bridge LLC converter is operated under frequency control while maintaining a low-side switch device of the second half bridge in an on-state and a high-side switch device of the second half bridge in an off-state. A fourth control mode may be selected if the nominal output voltage is a fourth voltage less than the third voltage. In the fourth control mode, the first half bridge of the full bridge LLC converter is operated under frequency control and the second half bridge of the full bridge LLC converter is operated under duty cycle control with valley switching while maintaining the high-side switch device of the second half bridge in the off-state. The full bridge LLC converter may enter a burst mode to support an extremely low voltage output, e.g., less than 24V.

The full bridge LLC converter system and corresponding control technique described herein enable a wide output voltage range for charger (adapter) application, charging station applications, and other applications with variable output voltage and/or current, with low system design complexity and high system efficiency. A smaller $CO_2$ footprint is realized by using a single full bridge LLC converter to support a wide output voltage range instead of multiple converter systems.

Described next, with reference to the figures, are various embodiments of the full bridge LLC converter system and corresponding control technique.

Figure 1:
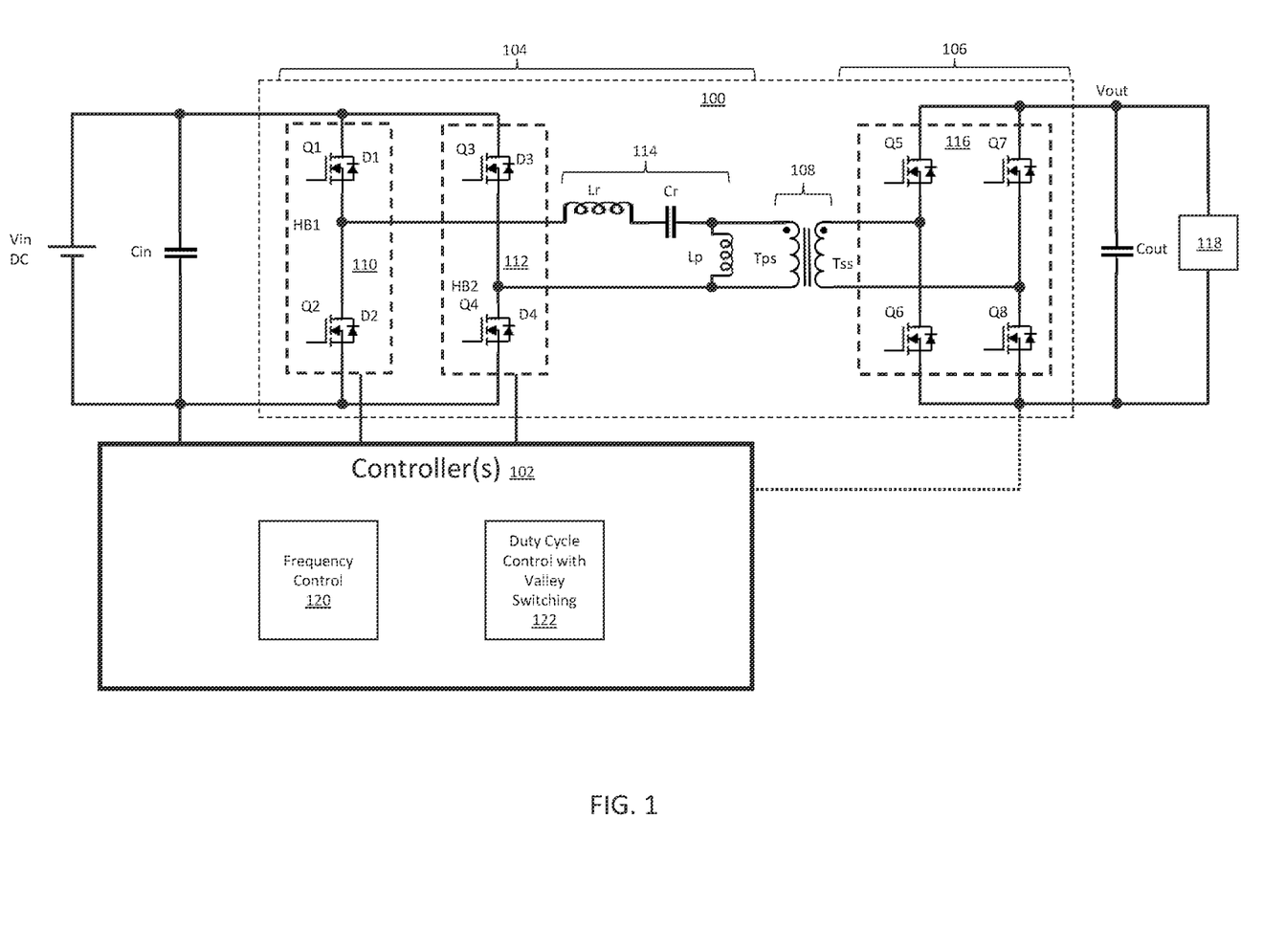
FIG. 1 illustrates a schematic diagram of a full bridge LLC converter system.
Figure 2:
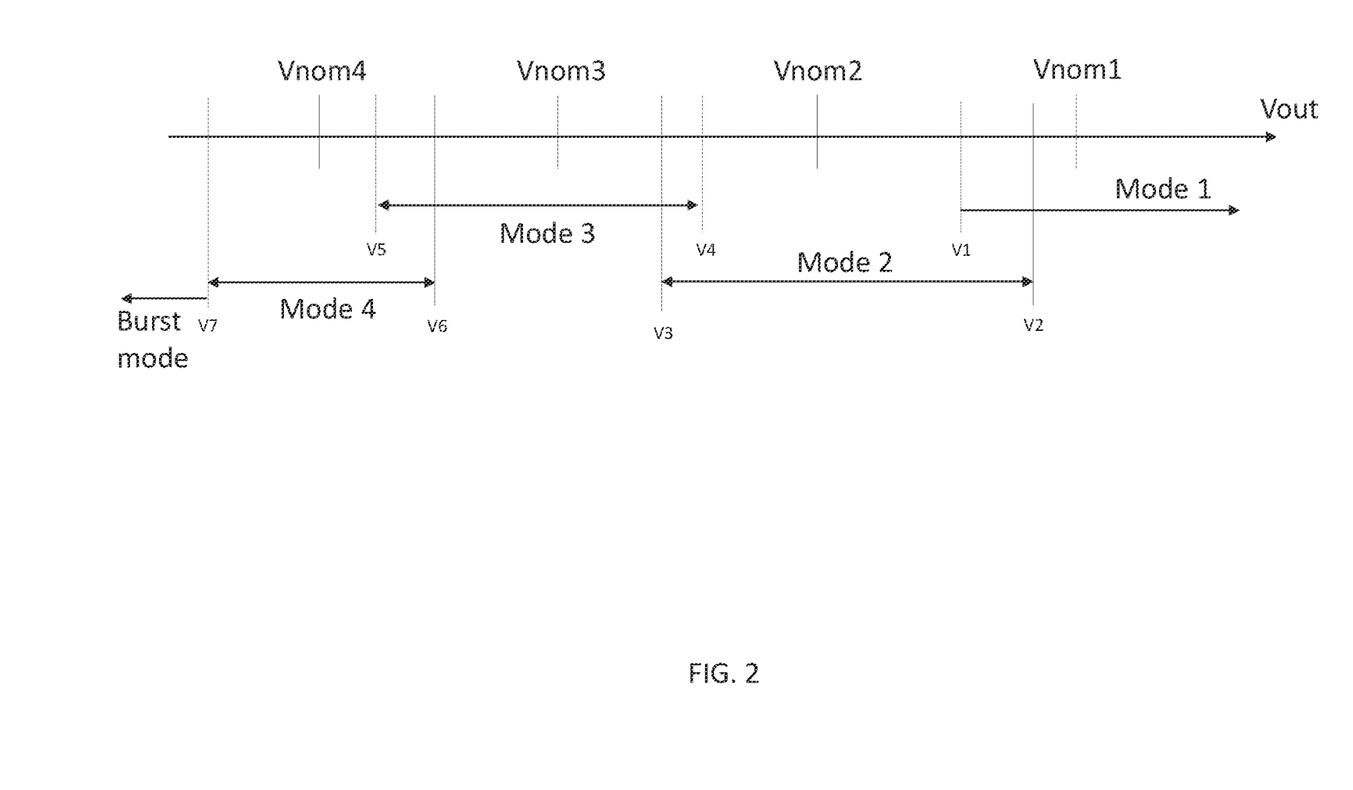
FIG. 2 illustrates an embodiment of a control technique for the full bridge LLC converter system.

FIG. 1 illustrates a schematic diagram of the full bridge LLC converter system and FIG. 2 illustrates an embodiment of the corresponding control technique, according to an embodiment.

The full bridge LLC converter system includes a full bridge LLC converter 100 and controller(s) 102 for the full bridge LLC converter 100. The full bridge LLC converter 100 includes a primary side 104 coupled to a secondary side 106 by an isolation transformer 108. The primary side 104 includes a first half bridge 110, a second half bridge 112, and a resonant tank 114 electrically coupled to an output HB1, HB2 of both half bridges 110, 112. One or more resonant elements of the resonant tank 114 may be implemented by parasitics of the isolation transformer 108. For example, a series resonant inductor 'Lr' of the resonant tank 114 may be implemented by the leakage inductance of the isolation transformer 108 and a parallel inductor 'Lp' of the resonant tank 114 may be implemented by the magnetizing inductance of the isolation transformer 108. The resonant tank 114 also includes a first winding Tps of the isolation transformer 108 and an equivalent series capacitor 'Cr'.

The first half bridge 110 of the full bridge LLC converter 100 includes a first high-side switch device Q1 and parallel coupled freewheeling diode D1 connected in series with a first low-side switch device Q2 and parallel coupled freewheeling diode D2 at a first switch node HB1 to form a first switching bridge. The first switch node HB1 is connected to the series resonant inductor Lr of the resonant tank 114.

The second half bridge 112 of the full bridge LLC converter 100 similarly includes a second high-side switch device Q3 and parallel coupled freewheeling diode D3 connected in series with a second low-side switch device Q4 and parallel coupled freewheeling diode D4 at a second switch node HB2 to form a second switching bridge. The second switch node HB2 is connected to the parallel inductor Lp and the first transformer winding Tps of the resonant tank 114.

The secondary side 106 of the full bridge LLC converter 100 includes a secondary-side switch network 116 having at least a first rectification branch Q5, Q6 and a second rectification branch Q7, Q8 coupled to different tap points of a second winding Tss of the isolation transformer 108. The secondary-side switch network 116 is illustrated as a full bridge rectifier, however other types of rectification stages may be used such as a center-taped rectification stage, current doubler rectification stage, etc. Also, the switch devices Q1-Q4 on the primary side 104 of the full bridge LLC converter 100 and the switch devices Q5-Q8 on the secondary side 106 of the full bridge LLC converter 100 are illustrated as power MOSFETs (metal-oxide-semiconductor field effect transistor). However, any suitable power transistor may be used for the switch devices Q1-Q4 on the primary side 104 and for the switch devices Q5-Q8 on the secondary side 106, such as but not limited to power MOSFETs, IGBTs (insulated gate bipolar transistors), HEMTs (high-electron mobility transistors), etc.

A single controller 102 may be used for both half bridges 110, 112 of the full bridge LLC converter 100 or a different controller 102 may be used for each half bridge 110, 112. In either case, the controller(s) 102 selects a control mode for the full bridge LLC converter 100 based on a nominal output voltage 'Vnom' for the full bridge LLC converter system. The resonant tank 114 outputs a resonant sinusoidal current that is scaled and rectified by the isolation transformer 108 and the switch network 116 on the secondary side 106 of the full bridge LLC converter 100. The secondary-side switch network 116 rectifies the energy transferred over the isolation transformer 108 in each control mode selected by the controller(s) 102, and an output capacitor 'Cout' filters the rectified current and outputs a DC voltage for a load 118 such as a battery system. Energy is applied to the primary side 104 of the full bridge LLC converter 100 via a DC link voltage 'Vin DC' which may be generated by a PFC (power factor correction) converter or some other rectified AC source. The DC link voltage Vin charges an input capacitor 'Cin' that is in parallel with the half bridges 110, 112 of the full bridge LLC converter 100.

As shown in FIG. 2, the controller(s) 102 selects a first control mode 'Mode 1' for the full bridge LLC converter 100 if the nominal output voltage Vnom is a first voltage 'Vnom1' greater than V1 and selects a second control mode 'Mode 2' if the nominal output voltage Vnom is a second voltage 'Vnom2' less than the first voltage (Vnom2<Vnom1) and between V2 and V3. The control mode of the full bridge LLC converter 100 is typically selected once based on load (e.g., battery) voltage and/or current but can transit (change) during operation based on load voltage and/or current. For example, if the load 118 is a battery system and the type of battery changes, then the controller(s) 102 may change control mode accordingly. Signalling from the load 118 to the controller(s) 102 indicates the battery type, e.g., via USB PD protocol, and the controller(s) 102 selects the optimal control mode based on the indicated battery type. Charging stations indicate battery type/voltage class using a similar type of communication and the load 118 shown in FIG. 1 is intended to charger (adapter) applications, charging station applications, and other applications with variable output voltage and/or current, where in each case the load 118 has a nominal voltage.

In the first control mode ('Mode 1' in FIG. 2), the controller(s) 102 operates the full bridge LLC converter 100 as a full bridge under frequency control. In the first control mode, the positive '+' terminal of the DC link Vin is connected to the series resonant inductor Lr of the resonant tank 114 through the high-side switch device Q1 of the first half bridge 110 and the negative terminal '−' of the DC link Vin is connected to the parallel inductor Lp and the first transformer winding Tps of the resonant tank 114 through the low-side switch device Q4 of the second half bridge 112 during a first part of a switching period. During a second part of the same switching period, the positive terminal of the DC link Vin is connected to the parallel inductor Lp and the first transformer winding Tps of the resonant tank 114 through the high-side switch device Q3 of the second half bridge 112 and the negative terminal of the DC link Vin is connected to the series resonant inductor Lr of the resonant tank 114 through the low-side switch device Q2 of the first half bridge 110. The location of the series resonant inductor Lr, equivalent series capacitor Cr, and the primary side winding Tps can be changed since these components are in series. Accordingly, the connections to the resonant tank 114 described above may be different than what is shown in FIG. 1.

Figure 3:
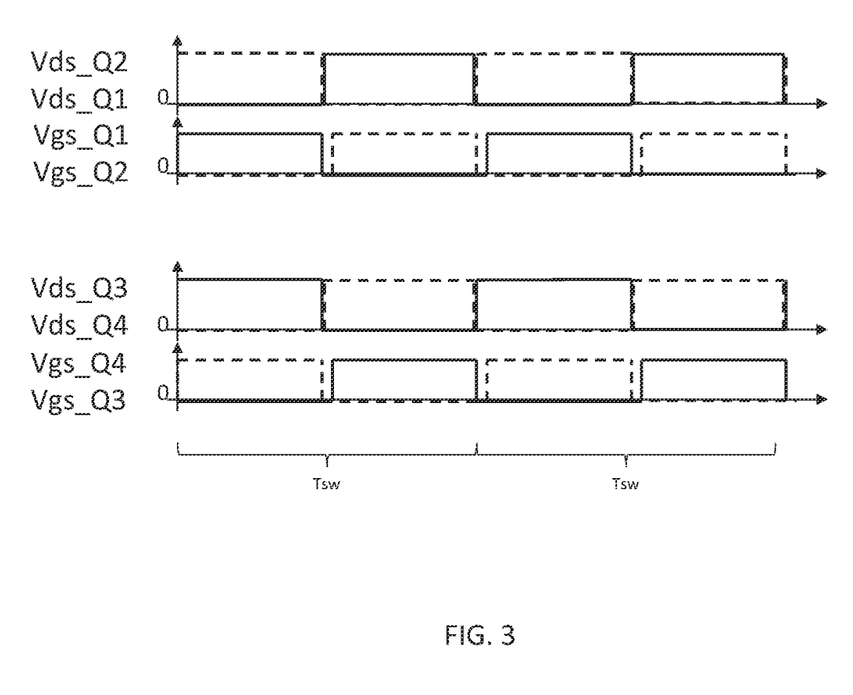
FIG. 3 illustrates corresponding gate-to-source voltages and drain-to-source voltages for the switch devices of the half bridges on the primary side of the full bridge LLC converter system, in a first control mode.

FIG. 3 illustrates corresponding gate-to-source voltages 'Vgs' and drain-to-source voltages 'Vds' for the switch devices Q1-Q4 of the half bridges 110, 112 on the primary side 104 of the full bridge LLC converter 100, in the first control mode ('Mode 1' in FIG. 2). Each gate-to-source voltage Vgs_Qx corresponds to the respective gate signal generated by the controller(s) 102. Each drain-to-source voltage Vds_Qx depends on whether that switch device Q1-Q4 is on (conducting) or off (blocking).

As shown in FIG. 3, in the first control mode ('Mode 1' in FIG. 2), the high-side switch device Q1 of the first half bridge 110 and the low-side switch device Q4 of the second half bridge 112 are both on during the first part of each switching period 'Tsw' and the opposite switch device Q2, Q3 of each half bridge is off. The on/off states are reversed during the second part of each switching period Tsw, where the high-side switch device Q3 of the second half bridge 112 and the low-side switch device Q2 of the first half bridge 110 are both on and the opposite switch device Q1, Q4 of each half bridge is off. Power is transferred to the secondary side 106 of the full bridge LLC converter 100 by energizing the primary side winding Tps in this alternate way.

The controller(s) 102 includes a frequency control loop 120 that implements pulse frequency modulation (PFM) for adjusting the frequency of each switching period Tsw in the first control mode ('Mode 1' in FIG. 2), to regulate the output voltage 'Vout' and/or current of the full bridge LLC converter system to Vnom1. The gates Vgs_Q1, Vgs_Q2 of the first half bridge 110 operate with 50% duty cycle including dead time as do the gates Vgs_Q3, Vgs_Q4 of the second half bridge 112, with output voltage regulation being implemented by the frequency control loop 120.

In the second control mode ('Mode 2' in FIG. 2), the frequency control loop 120 of the controller(s) 102 operates the first half bridge 110 under frequency control and a duty cycle control loop 122 of the controller(s) 102 operates the second half bridge 112 under duty cycle control with valley switching to regulate the output voltage 'Vout' and/or current to Vnom2. In the second control mode, the duty cycle of the first half bridge 110 is fixed to 50% including dead time but the switching frequency is varied under frequency control and the switching frequency of the second half bridge 112 is the same as the first half bridge 110 but the duty cycle is varied under duty cycle control with valley switching.

A single controller 102 may provide both the frequency control loop 120 for operation of the half bridges 110, 112 in the first control mode (Mode 1 in FIG. 2) and the duty cycle control loop 122 for implementing duty cycle control with valley switching in the second control mode (Mode 2 in FIG. 2). Alternatively, a first controller 102 may implement the frequency control loop 120 for operation of the half bridges 110, 112 in the first control mode and a second controller 102 may implement the duty cycle control loop 122 for duty cycle control with valley switching in the second control mode.

Figure 4:
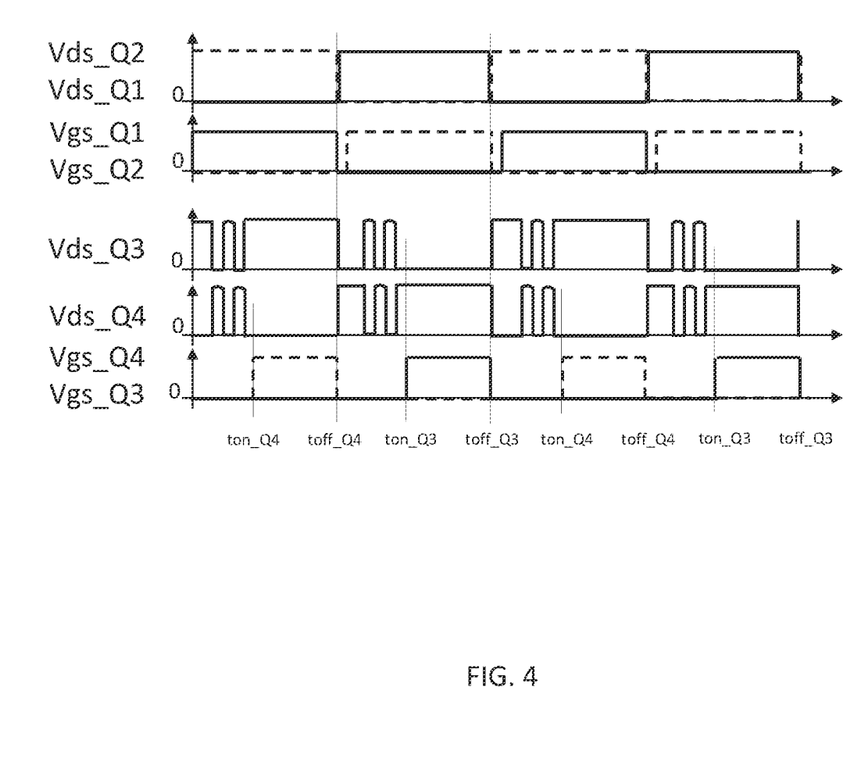
FIG. 4 illustrates the corresponding gate-to-source voltages and drain-to-source voltages for the switch devices of the half bridges on the primary side of the full bridge LLC converter system, in a second control mode.

In either case, FIG. 4 illustrates corresponding gate-to-source voltages 'Vgs' and drain-to-source voltages 'Vds' for the switch devices Q1-Q4 of the half bridges 110, 112 on the primary side 104 of the full bridge LLC converter 100 in the second control mode ('Mode 2' in FIG. 2). As shown in FIGS. 3 and 4, the first half bridge 110 is operated the same way in both the first control mode and the second control mode. However, the second half bridge 112 is operated under duty cycle control with valley switching in the second control mode.

More particularly, the duty cycle control loop 122 of the controller(s) 102 implements low-side valley switching in the second control mode by turning on ('ton_Q4' in FIG. 4) the low-side switch device Q4 of the second half bridge 112 in response to the drain-to-source voltage Vds_Q4 of the low-side switch device Q4 dropping below a first threshold value 'V_vlt'. In FIG. 4, turn-on of the low-side switch device Q4 of the second half bridge 112 is indicated by the low-to-high transition in Vgs_Q4 and occurs in response to the second valley of V_ds_Q4 but instead may occur in response to the first valley or a valley after the second valley. The delay from the second valley of V_ds_Q4 to the turn on of low-side switch device Q4 in FIG. 4 represents signal propagation delay.

Figure 5:
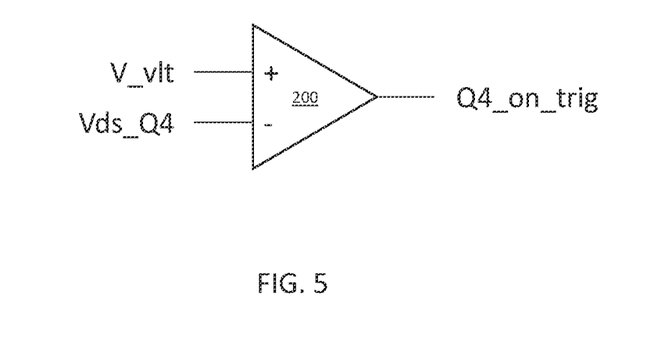
FIG. 5 illustrates an embodiment of a low-side valley detection comparator circuit for detecting a valley switching point for the low-side switch device of the second half bridge of the full bridge LLC converter system.

FIG. 5 illustrates an embodiment of a low-side valley detection comparator circuit 200 included in the controller(s) 102 for detecting a valley of V_ds_Q4, where the comparator output 'Q4_on_trig' indicates when a valley is detected. During low-side valley switching in the second control mode ('Mode 2' in FIG. 2), the duty cycle control loop 122 turns off the low-side switch device Q4 of the second half bridge 112 at the same time ('toff_Q4' in FIG. 4) as the high-side switch device Q1 of the first half bridge 110.

The duty cycle control loop 122 implements high-side valley switching in the second control mode ('Mode 2' in FIG. 2) by turning on ('ton_Q3' in FIG. 4) the high-side switch device Q3 of the second half bridge 112 in response to the drain-to-source voltage Vds_Q3 of the low-side switch device Q4 of the second half bridge 112 rising above a second threshold value 'V_vht'. In FIG. 4, turn-on of the high-side switch device Q3 of the second half bridge 112 is indicated by the low-to-high transition in Vgs_Q3 and occurs in response to the second valley of V_ds_Q4 but instead may occur in response to the first valley or a valley after the second valley. The delay from the second valley of V_ds_Q4 to the turn on of high-side switch device Q3 in FIG. 4 represents signal propagation delay. A single valley detection circuit may be used to implement both the low-side valley detection and the high-side valley detection.

V_ds_Q3 instead may be measured for implementing valley switching of the high-side switch device Q3 of the second half bridge 112.

Figure 6:
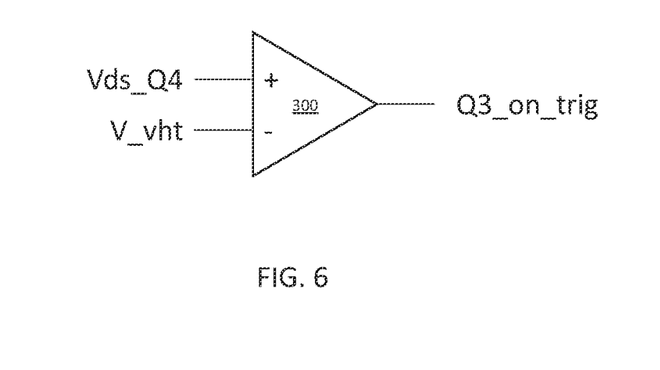
FIG. 6 illustrates an embodiment of a high-side valley detection comparator circuit for detecting a valley switching point for the high-side switch device of the second half bridge of the full bridge LLC converter system.

FIG. 6 illustrates an embodiment of a high-side valley detection comparator circuit 300 included in the controller(s) 102 for detecting a valley of V_ds_Q4 (or alternatively a valley of V_ds_Q3), where the comparator output 'Q3_on_trig' indicates when a valley is detected. During high-side valley switching in the second control mode ('Mode 2' in FIG. 2), the duty cycle control loop 122 turns off the high-side switch device Q3 of the second half bridge 112 at the same time ('toff_Q3' in FIG. 4) as the low-side switch device Q2 of the first half bridge 110.

Figure 7:
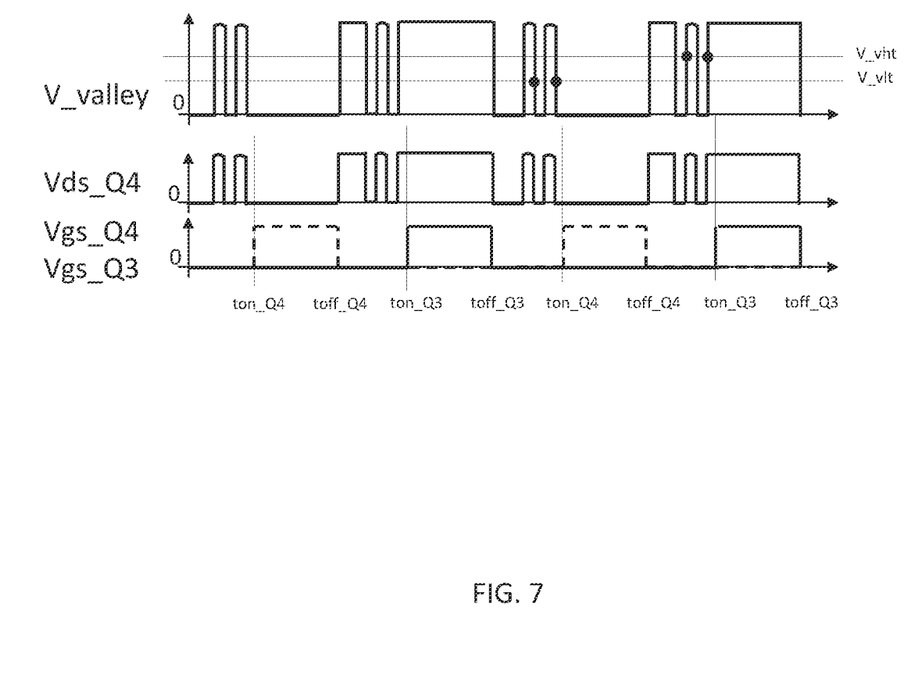
FIG. 7 illustrates an embodiment of the low-side valley detection and the high-side valley detection implemented during the second control mode.

FIG. 7 illustrates an embodiment of the low-side valley detection and the high-side valley detection during the second control mode ('Mode 2' in FIG. 2). As described above, the drain-to-source voltage Vds_Q4 of the low-side switch device Q4 of the second half bridge 112 may be measured/sensed to implement both the low-side valley detection and the high-side valley detection. For example, the drain voltage at the second switch node HB2 may be sensed across a voltage divider to yield voltage V_valley in FIG. 7. The sensed voltage V_valley is compared to the low-side valley detection threshold V_vlt and to the high-side valley detection threshold V_vht, e.g., as shown in FIGS. 5 and 6, respectively, where V_valley corresponds to Vds_Q4. This technique ensures that that both the low-side switch device Q4 and the high-side switch device Q3 of the second half bridge 112 turn on at a valley.

More particularly, and as shown in FIG. 7, the gate (Vgs_Q3) of the high-side switch device Q3 of the second half bridge 112 turns on when the voltage V_valley is higher than V_vht at the rising edge of V_valley and the gate (Vgs_Q4) of the low-side switch device Q4 of the second half bridge 112 turns on when the voltage V_valley is lower than V_vlt at the falling edge of V_valley. As explained above, a single valley detection circuit may be sufficient and therefore reduce design complexity. Also, the valley number (shown as the second valley in FIG. 7) may be programmable.

Figure 8:
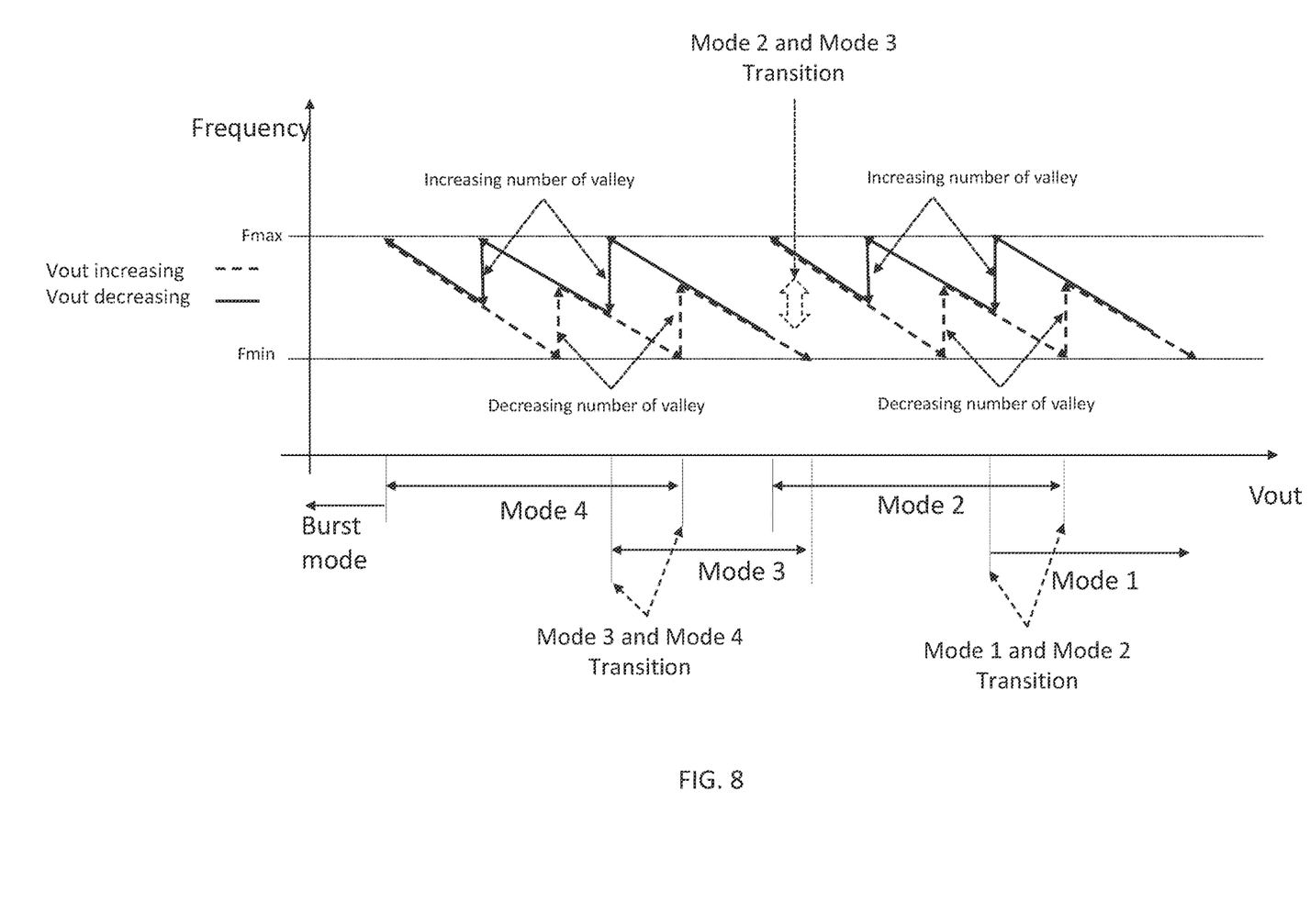
FIG. 8 illustrates the relationship between valley number and switching frequency.

FIG. 8 illustrates the relationship between valley number and switching frequency. The switching frequency of the half bridges 110, 112 is bound by a minimum frequency 'Fmin' and a maximum frequency 'Fmax' for the full bridge LLC converter 100. Between these two (2) frequency limits, the controller(s) 102 may change the valley number used for the low-side valley detection and/or the high-side valley detection described herein, to adjust the gain of the full bridge LLC converter system. If the regulated output voltage Vout of the full bridge LLC converter system is decreased, lower gain is needed. Conversely, higher gain is need if Vout is increased. The controller(s) 102 may track the output voltage Vout and/or current and determine when to adjust the valley number, where the frequency limits (Fmin, Fmax) for the system and the number of available valleys may be based on the parameters of the resonant tank 114.

In the second control mode (Mode 2), the controller(s) 102 may increase the switching frequency of the first half bridge 110 in response to a decrease in the load voltage and/or current and may increase the valley number for the second half bridge 112 if the upper frequency limit Fmax is reached for the first half bridge 110. FIG. 8 shows that each increase in valley number yields a drop in switching frequency, which ensures the switching frequency of the first half bridge 110 does not rise above the upper frequency limit Fmax. Conversely, in the second control mode, the controller(s) 102 may decrease the frequency of the first half bridge 110 in response to an increase in the load voltage and/or current and may decrease the valley number for the second half bridge 112 if the lower frequency limit Fmin is reached for the first half bridge 110. FIG. 8 shows that each decrease in valley number yields a rise in switching frequency, which ensures the switching frequency of the first half bridge 110 does not drop below the lower frequency limit Fmin.

If the upper (maximum) or lower (minimum) permitted valley number is reached, a further increase or decrease, respectively, in the valley number is not available. In FIG. 8, this occurs for an output voltage range that overlaps between the second control mode (Mode 2) and a third control mode (Mode 3). However, the controller(s) 102 may transition between the second control mode (Mode 2) and the third control mode (Mode 3) which effectively resets the valley number to enable the wider output voltage range, as indicated in FIG. 8 by the vertical dual arrow labelled 'Mode 2 and Mode 3 Transition'. For example, the controller(s) 102 may select the third control mode ('Mode 3' in FIG. 2) if the nominal output voltage Vnom is a third voltage 'Vnom3' less than the second voltage Vmon2 and between V4 and V5, e.g., as shown in FIG. 2. In the third control mode, the frequency control loop 120 operates the first half bridge 110 under frequency control, as previously described herein, and the duty cycle control loop 122 maintains the low-side switch device Q4 of the second half bridge 112 in the on-state (conducting) and the high-side switch device Q3 of the second half bridge 112 in the off-state (blocking).

During operation, the controller(s) 102 may implement a mode transition for other modes such as for Mode 1 and Mode 2 and Mode 3 and Mode 4, as indicated in FIG. 8. Regarding both the Mode 1 and Mode 2 transition and the Mode 3 and Mode 4 transition, the mode will be Mode 1 or Mode 3 if the valley number is zero and will be Mode 2 or Mode 4 if the valley number is greater than zero.

Figure 9:
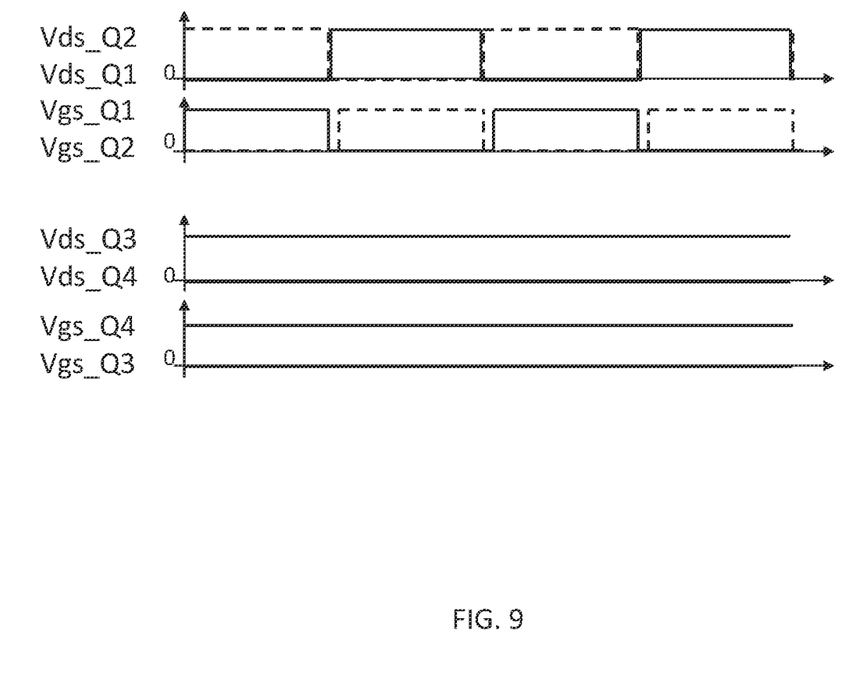
FIG. 9 illustrates the corresponding gate-to-source voltages and drain-to-source voltages for the switch devices of the half bridges on the primary side of the full bridge LLC converter system, in a third control mode.

FIG. 9 illustrates corresponding gate-to-source voltages Vgs_Qx and drain-to-source voltages Vds_Qx for the switch devices Q1-Q4 of the half bridges 110, 112 on the primary side 104 of the full bridge LLC converter 100, in the third control mode ('Mode 3' in FIG. 2). As shown in FIGS. 3, 4 and 9, the first half bridge 110 is operated the same way (under frequency control) via the frequency control loop 120 in the third control mode as in the second control mode ('Mode 2' in FIG. 2) and the first control mode ('Mode 1' in FIG. 2). Different than the second control mode, the gate of the high-side switch device Q3 of the second half bridge 112 is always off (Vgs_Q3=0V) and the gate of the low-side switch device Q4 of the second half bridge 112 is always on (Vgs_Q4>0V) in the third control mode such that the full bridge LLC converter 100 is operated as a single half bridge.

The controller(s) 102 may decide to transition from the third control mode ('Mode 3' in FIG. 2) to a fourth control mode ('Mode 4' in FIG. 2) to support an even lower nominal output voltage Vnom. For example, the controller(s) 102 may select the fourth control mode ('Mode 4' in FIG. 2) if the nominal output voltage is a fourth voltage 'Vnom4' less than the third voltage Vmon3 and between V6 and V7, e.g., as shown in FIG. 2. In the fourth control mode, the frequency control loop 120 operates the first half bridge 110 under frequency control and the duty cycle control loop 122 operates the second half bridge 112 under duty cycle control with valley switching while maintaining the high-side switch device Q3 of the second half bridge 112 in the off-state.

Figure 10:
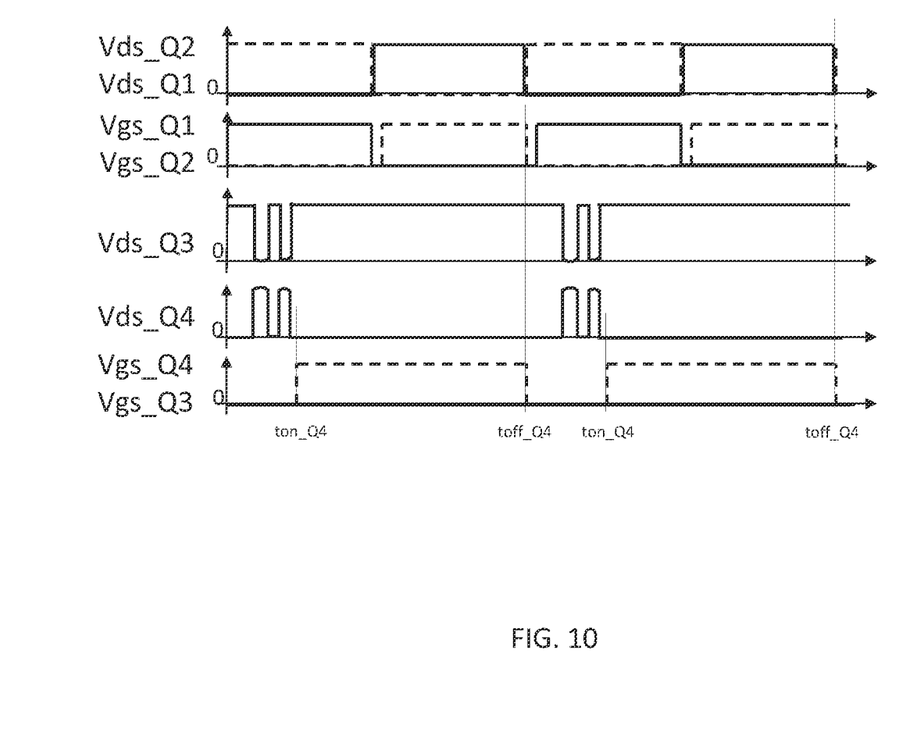
FIG. 10 illustrates the corresponding gate-to-source voltages and drain-to-source voltages for the switch devices of the half bridges on the primary side of the full bridge LLC converter system, in a fourth control mode.

FIG. 10 illustrates corresponding gate-to-source voltages Vgs_Qx and drain-to-source voltages Vds_Qx for the switch devices Q1-Q4 of the half bridges 110, 112 on the primary side 104 of the full bridge LLC converter 100, in the fourth control mode ('Mode 4' in FIG. 2). The first half bridge 110 is still operated under frequency control via the frequency control loop 120 in the fourth control mode. Also in the fourth control mode, the duty cycle control loop 122 implements only low-side valley switching by turning on ('ton_Q4' in FIG. 10) the low-side switch device Q4 of the second half bridge 112 in response to the drain-to-source voltage Vds_Q4 of the low-side switch device Q4 dropping below the corresponding threshold value 'V_vlt', e.g., as shown in FIG. 5. The high-side switch device Q3 of the second half bridge 112 is maintained in the off-state in the fourth control mode, as indicated by the zero gate voltage (Vgs_Q3=0V) in FIG. 10. The duty cycle control loop 122 turns off the low-side switch device Q4 of the second half bridge 112 at the same time ('toff_Q4' in FIG. 10) as the low-side switch device Q2 of the first half bridge 110 in the fourth control mode ('Mode 4' in FIG. 2). Accordingly, the frequency of the low-side switch device Q4 of the second half bridge 112 is the same as the first half bridge 110 while the high-side switch device Q3 of the second half bridge 112 remains off in the fourth mode. The low-side switch device Q4 of the second half bridge 112 operates with valley switching in both Mode 2 and Mode 4.

Figure 11:
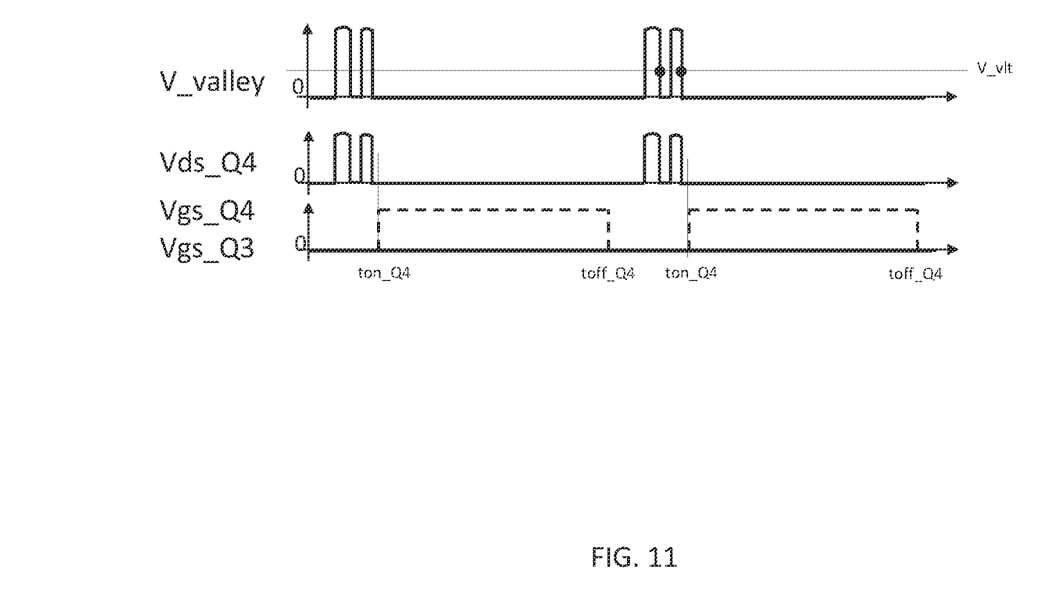
FIG. 11 illustrates an embodiment of the low-side valley detection implemented during the fourth control mode.

FIG. 11 illustrates an embodiment of the low-side valley detection implemented during the fourth control mode ('Mode 4' in FIG. 2). As described above, the drain-to-source voltage Vds_Q4 of the low-side switch device Q4 of the second half bridge 112 may be measured/sensed to implement the low-side valley detection, e.g., by sensing the drain voltage at the second switch node HB2 across a voltage divider to yield voltage V_valley in FIG. 11. The sensed voltage V_valley is compared to the low-side valley detection threshold V_vlt, e.g., as shown in FIG. 5, where V_valley corresponds to Vds_Q4, to ensure the low-side switch device Q4 of the second half bridge 112 turns on at a valley.

As shown in FIG. 11, the gate of the high-side switch device Q3 of the second half bridge 112 is always off (Vgs_Q3=0V) in the fourth control mode ('Mode 4' in FIG. 2). The gate (Vgs_Q4) of the low-side switch device Q4 of the second half bridge 112 turns on when the voltage V_valley is lower than V_vlt at the falling edge.

The second valley triggers the turn-on of the low-side switch device Q4 of the second half bridge 112 in FIG. 11, as an example. A different valley number may be used and the valley number may be programmable, as previously explained herein. For example, in the fourth control mode ('Mode 4' in FIG. 2), the controller(s) 102 may increase the switching frequency of the first half bridge 110 in response to a decrease in the nominal output voltage and/or current and may increase the valley number for the second half bridge 112 if the upper frequency limit Fmax is reached for the first half bridge 110, e.g., as shown in FIG. 8. In the fourth control mode, the controller(s) 102 may decrease the switching frequency of the first half bridge 110 in response to an increase in the nominal output voltage and/or current and may decrease the valley number for the second half bridge 112 if the lower frequency limit Fmin is reached for the first half bridge 110, e.g., also as shown in FIG. 8.

The full bridge LLC converter system may enter a burst mode to support an even lower nominal output voltage Vnom, e.g., less than V7 in FIG. 2. As an example, the full bridge LLC converter system may be configured in the first mode ('Mode 1' in FIG. 2) for a nominal output voltage Vnom of 96V, in the second mode ('Mode 2' in FIG. 2) for a nominal output voltage Vnom of 72V, in the third mode ('Mode 3' in FIG. 2) for a nominal output voltage Vnom of 48V, in the fourth mode ('Mode 4' in FIG. 2) for a nominal output voltage Vnom of 36V, and in burst mode for a nominal output voltage Vnom of 24V or lower.

As shown in FIG. 2, each control mode of the full bridge LLC converter system supports a voltage range. For example, in FIG. 2, Mode 1 supports voltages down to V1, Mode 2 supports voltages between V2 and V3, Mode 3 supports voltages between V4 and V5, Mode 4 supports voltages between V6 and V7, and burst mode supports voltages below V7. Some or all of the voltage ranges may overlap, as shown in FIG. 2, to ensure seamless and efficient operation for charger (adapter) and charging station applications over a wide range of battery voltages, e.g., 24V to 240V.

Although the present disclosure is not so limited, the following numbered examples demonstrate one or more aspects of the disclosure.

Example 1. A method of voltage regulation using a full bridge LLC converter, the method comprising: selecting a control mode for the full bridge LLC converter based on a nominal output voltage for the full bridge LLC converter, wherein selecting the control mode comprises selecting a first control mode if the nominal output voltage is a first voltage and selecting a second control mode if the nominal output voltage is a second voltage less than the first voltage; in the first control mode, operating the full bridge LLC converter as a full bridge under frequency control; and in the second control mode, operating a first half bridge of the full bridge LLC converter under frequency control and operating a second half bridge of the full bridge LLC converter under duty cycle control with valley switching.

Example 2. The method of example 1, wherein in the second control mode, operating the second half bridge under duty cycle control with valley switching comprises: turning on a low-side switch device of the second half bridge in response to a drain-to-source voltage of the low-side switch device dropping below a first threshold value; and turning off the low-side switch device of the second half bridge at a same time as a high-side switch device of the first half bridge.

Example 3. The method of example 2, wherein in the second control mode, operating the second half bridge under duty cycle control with valley switching further comprises: turning on a high-side switch device of the second half bridge in response to the drain-to-source voltage of the low-side switch device of the second half bridge rising above a second threshold value; and turning off the high-side switch device of the second half bridge at a same time as a low-side switch device of the first half bridge.

Example 4. The method of any of examples 1 through 3, further comprising in the second control mode: increasing a frequency of the first half bridge in response to a decrease in the nominal output voltage and/or current; and increasing a valley number for the second half bridge if an upper frequency limit is reached for the first half bridge.

Example 5. The method of any of examples 1 through 4, further comprising in the second control mode: decreasing a frequency of the first half bridge in response to an increase in the nominal output voltage and/or current; and decreasing a valley number for the second half bridge if a lower frequency limit is reached for the first half bridge.

Example 6. The method of any of examples 1 through 5, wherein selecting the control mode comprises selecting a third control mode if the nominal output voltage is a third voltage less than the second voltage, the method further comprising: in the third control mode, operating the first half bridge under frequency control while maintaining a low-side switch device of the second half bridge in an on-state and a high-side switch device of the second half bridge in an off-state.

Example 7. The method of example 6, wherein selecting the control mode comprises selecting a fourth control mode if the nominal output voltage is a fourth voltage less than the third voltage, the method further comprising: in the fourth control mode, operating the first half bridge under frequency control and operating the second half bridge under duty cycle control with valley switching while maintaining the high-side switch device of the second half bridge in the off-state.

Example 8. The method of example 7, wherein in the fourth control mode, operating the second half bridge under duty cycle control with valley switching comprises: turning on the low-side switch device of the second half bridge on in response to a drain-to-source voltage of the low-side switch device dropping below a threshold value; and turning off the low-side switch device of the second half bridge at a same time as a low-side switch device of the first half bridge.

Example 9. The method of example 7 or 8, further comprising in the fourth control mode: increasing a frequency of the first half bridge in response to a decrease in the nominal output voltage and/or current; and increasing a valley number for the second half bridge if an upper frequency limit is reached for the first half bridge.

Example 10. The method of example 9, further comprising in the fourth control mode: decreasing a frequency of the first half bridge in response to an increase in the nominal output voltage and/or current; and decreasing a valley number for the second half bridge if a lower frequency limit is reached for the first half bridge.

Example 11. A full bridge LLC converter system, comprising: a full bridge LLC converter comprising a first half bridge, a second half bridge, and a resonant tank electrically coupled to an output of both the first half bridge and the second half bridge; and at least one controller configured to select a control mode for the full bridge LLC converter based on a nominal output voltage for the full bridge LLC converter, wherein the at least one controller is configured to select a first control mode if the nominal output voltage is a first voltage and select a second control mode if the nominal output voltage is a second voltage less than the first voltage, wherein in the first control mode, the at least one controller is configured to operate the full bridge LLC converter as a full bridge under frequency control, wherein in the second control mode, the at least one controller is configured to operate the first half bridge under frequency control and operate the second half bridge under duty cycle control with valley switching.

Example 12. The full bridge LLC converter system of example 11, wherein in the second control mode, the at least one controller is configured to turn on a low-side switch device of the second half bridge in response to a drain-to-source voltage of the low-side switch device dropping below a first threshold value and turn off the low-side switch device of the second half bridge at a same time as a high-side switch device of the first half bridge.

Example 13. The full bridge LLC converter system of example 12, wherein in the second control mode, the at least one controller is configured to turn on a high-side switch device of the second half bridge in response to the drain-to-source voltage of the low-side switch device of the second half bridge rising above a second threshold value and turn off the high-side switch device of the second half bridge at a same time as a low-side switch device of the first half bridge.

Example 14. The full bridge LLC converter system of any of examples 11 through 13, wherein in the second control mode, the at least one controller is configured to increase a frequency of the first half bridge in response to a decrease in the nominal output voltage and/or current, and increase a valley number for the second half bridge if an upper frequency limit is reached for the first half bridge.

Example 15. The full bridge LLC converter system of any of examples 11 through 14, wherein in the second control mode, the at least one controller is configured to decrease a frequency of the first half bridge in response to an increase in the nominal output voltage and/or current, and decrease a valley number for the second half bridge if a lower frequency limit is reached for the first half bridge.

Example 16. The full bridge LLC converter system of any of examples 11 through 15, wherein the at least one controller is configured to select a third control mode if the nominal output voltage is a third voltage less than the second voltage, and wherein in the third control mode, the at least one controller is configured to operate the first half bridge under frequency control while maintaining a low-side switch device of the second half bridge in an on-state and a high-side switch device of the second half bridge in an off-state.

Example 17. The full bridge LLC converter system of example 16, wherein the at least one controller is configured to select a fourth control mode if the nominal output voltage is a fourth voltage less than the third voltage, and wherein in the fourth control mode, the at least one controller is configured to operate the first half bridge under frequency control and operate the second half bridge under duty cycle control with valley switching while maintaining the high-side switch device of the second half bridge in the off-state.

Example 18. The full bridge LLC converter system of example 17, wherein in the fourth control mode, the at least one controller is configured to turn on the low-side switch device of the second half bridge in response to a drain-to-source voltage of the low-side switch device dropping below a threshold value and turn off the low-side switch device of the second half bridge at a same time as a low-side switch device of the first half bridge.

Example 19. The full bridge LLC converter system of example 17 or 18, wherein in the fourth control mode, the at least one controller is configured to increase a frequency of the first half bridge in response to a decrease in the nominal output voltage and/or current, and increase a valley number for the second half bridge if an upper frequency limit is reached for the first half bridge.

Example 20. The full bridge LLC converter system of example 19, wherein in the fourth control mode, the at least one controller is configured to decrease a frequency of the first half bridge in response to an increase in the nominal output voltage and/or current, and decrease a valley number for the second half bridge if a lower frequency limit is reached for the first half bridge.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to mean all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of voltage regulation using a full bridge LLC converter, the method comprising:
    selecting a control mode for the full bridge LLC converter based on a nominal output voltage for the full bridge LLC converter, wherein selecting the control mode comprises selecting a first control mode if the nominal output voltage is a first voltage and selecting a second control mode if the nominal output voltage is a second voltage less than the first voltage;
    in the first control mode, operating the full bridge LLC converter as a full bridge under frequency control; and
    in the second control mode, operating a first half bridge of the full bridge LLC converter under frequency control and operating a second half bridge of the full bridge LLC converter under duty cycle control with valley switching.

2. The method of claim 1, wherein in the second control mode, operating the second half bridge under duty cycle control with valley switching comprises:
    turning on a low-side switch device of the second half bridge in response to a drain-to-source voltage of the low-side switch device dropping below a first threshold value; and
    turning off the low-side switch device of the second half bridge at a same time as a high-side switch device of the first half bridge.

3. The method of claim 2, wherein in the second control mode, operating the second half bridge under duty cycle control with valley switching further comprises:
    turning on a high-side switch device of the second half bridge in response to the drain-to-source voltage of the low-side switch device of the second half bridge rising above a second threshold value; and
    turning off the high-side switch device of the second half bridge at a same time as a low-side switch device of the first half bridge.

4. The method of claim 1, further comprising in the second control mode:
    increasing a frequency of the first half bridge in response to a decrease in the nominal output voltage and/or current; and
    increasing a valley number for the second half bridge if an upper frequency limit is reached for the first half bridge.

5. The method of claim 1, further comprising in the second control mode:
    decreasing a frequency of the first half bridge in response to an increase in the nominal output voltage and/or current; and
    decreasing a valley number for the second half bridge if a lower frequency limit is reached for the first half bridge.

6. The method of claim 1, wherein selecting the control mode comprises selecting a third control mode if the nominal output voltage is a third voltage less than the second voltage, the method further comprising:
    in the third control mode, operating the first half bridge under frequency control while maintaining a low-side switch device of the second half bridge in an on-state and a high-side switch device of the second half bridge in an off-state.

7. The method of claim 6, wherein selecting the control mode comprises selecting a fourth control mode if the nominal output voltage is a fourth voltage less than the third voltage, the method further comprising:
    in the fourth control mode, operating the first half bridge under frequency control and operating the second half bridge under duty cycle control with valley switching while maintaining the high-side switch device of the second half bridge in the off-state.

8. The method of claim 7, wherein in the fourth control mode, operating the second half bridge under duty cycle control with valley switching comprises:
    turning on the low-side switch device of the second half bridge on in response to a drain-to-source voltage of the low-side switch device dropping below a threshold value; and
    turning off the low-side switch device of the second half bridge at a same time as a low-side switch device of the first half bridge.

9. The method of claim 7, further comprising in the fourth control mode:
    increasing a frequency of the first half bridge in response to a decrease in the nominal output voltage and/or current; and
    increasing a valley number for the second half bridge if an upper frequency limit is reached for the first half bridge.

10. The method of claim 9, further comprising in the fourth control mode:
    decreasing a frequency of the first half bridge in response to an increase in the nominal output voltage and/or current; and
    decreasing a valley number for the second half bridge if a lower frequency limit is reached for the first half bridge.

11. A full bridge LLC converter system, comprising:
    a full bridge LLC converter comprising a first half bridge, a second half bridge, and a resonant tank electrically coupled to an output of both the first half bridge and the second half bridge; and
    at least one controller configured to select a control mode for the full bridge LLC converter based on a nominal output voltage for the full bridge LLC converter,
    wherein the at least one controller is configured to select a first control mode if the nominal output voltage is a first voltage and select a second control mode if the nominal output voltage is a second voltage less than the first voltage, wherein in the first control mode, the at least one controller is configured to operate the full bridge LLC converter as a full bridge under frequency control, wherein in the second control mode, the at least one controller is configured to operate the first half bridge under frequency control and operate the second half bridge under duty cycle control with valley switching.

12. The full bridge LLC converter system of claim 11, wherein in the second control mode, the at least one controller is configured to turn on a low-side switch device of the second half bridge in response to a drain-to-source voltage of the low-side switch device dropping below a first threshold value and turn off the low-side switch device of the second half bridge at a same time as a high-side switch device of the first half bridge.

13. The full bridge LLC converter system of claim 12, wherein in the second control mode, the at least one controller is configured to turn on a high-side switch device of the second half bridge in response to the drain-to-source voltage of the low-side switch device of the second half bridge rising above a second threshold value and turn off the high-side switch device of the second half bridge at a same time as a low-side switch device of the first half bridge.

14. The full bridge LLC converter system of claim 11, wherein in the second control mode, the at least one controller is configured to increase a frequency of the first half bridge in response to a decrease in the nominal output voltage and/or current, and increase a valley number for the second half bridge if an upper frequency limit is reached for the first half bridge.

15. The full bridge LLC converter system of claim 11, wherein in the second control mode, the at least one controller is configured to decrease a frequency of the first half bridge in response to an increase in the nominal output voltage and/or current, and decrease a valley number for the second half bridge if a lower frequency limit is reached for the first half bridge.

16. The full bridge LLC converter system of claim 11, wherein the at least one controller is configured to select a third control mode if the nominal output voltage is a third voltage less than the second voltage, and wherein in the third control mode, the at least one controller is configured to operate the first half bridge under frequency control while maintaining a low-side switch device of the second half bridge in an on-state and a high-side switch device of the second half bridge in an off-state.

17. The full bridge LLC converter system of claim 16, wherein the at least one controller is configured to select a fourth control mode if the nominal output voltage is a fourth voltage less than the third voltage, and wherein in the fourth control mode, the at least one controller is configured to operate the first half bridge under frequency control and operate the second half bridge under duty cycle control with valley switching while maintaining the high-side switch device of the second half bridge in the off-state.

18. The full bridge LLC converter system of claim 17, wherein in the fourth control mode, the at least one controller is configured to turn on the low-side switch device of the second half bridge in response to a drain-to-source voltage of the low-side switch device dropping below a threshold value and turn off the low-side switch device of the second half bridge at a same time as a low-side switch device of the first half bridge.

19. The full bridge LLC converter system of claim 17, wherein in the fourth control mode, the at least one controller is configured to increase a frequency of the first half bridge in response to a decrease in the nominal output voltage and/or current, and increase a valley number for the second half bridge if an upper frequency limit is reached for the first half bridge.

20. The full bridge LLC converter system of claim 19, wherein in the fourth control mode, the at least one controller is configured to decrease a frequency of the first half bridge in response to an increase in the nominal output voltage and/or current, and decrease a valley number for the second half bridge if a lower frequency limit is reached for the first half bridge.

* * * * *

UNITED STATES PATENT AND TRADEMARK OFFICE
CERTIFICATE OF CORRECTION

PATENT NO. : 12,341,432 B2
APPLICATION NO. : 18/139088
DATED : June 24, 2025
INVENTOR(S) : T. Kim Page 1 of 1

It is certified that error appears in the above-identified patent and that said Letters Patent is hereby corrected as shown below:

In the Claims

Column 14, Line 36 (Claim 8) please change "bridge on in response" to -- bridge in response --

Signed and Sealed this
Fifth Day of August, 2025

Coke Morgan Stewart
*Acting Director of the United States Patent and Trademark Office*